Patented June 13, 1950

2,511,575

UNITED STATES PATENT OFFICE

2,511,575

PROCESS FOR MANUFACTURE OF A DRY SAPONIFIED RESIN

John J. Flaherty, Jr., Savannah, Ga., assignor to Hercules Powder Company, Wilmington, Del., a corporation of Delaware No Drawing. Application August 7, 1947, Serial No. 767,327

4 Claims. (Cl. 260—105)

This invention relates in general to a process for the manufacture of a dry, saponified resin and in particular to a process for the manufacture of a dry, substantially neutral resinate.

The usual method for the manufacture of a dry, neutralized resinate such as, for example, a dry rosin size is to react molten rosin with an aqueous solution of caustic soda under pressure and at an elevated temperature until saponification is complete, after which the saponified rosin is dried, for example, by spray drying or other convenient drying means. It has long been recognized that it would be desirable to replace the relatively expensive caustic soda with the relatively less expensive and less corrosive soda ash or sodium carbonate. Unfortunately, however, the saponification with sodium carbonate does not go to completion under the high pressure which results from the formation of large quantities of carbon dioxide gas during the saponification, since under these conditions a chemical equilibrium is set up. In any event, even if a suitable method were devised for causing the saponification to run to completion, the pressures developed by the formation of such large quantities of gas would require the use of prohibitively expensive equipment.

Various methods have been developed to overcome these difficulties and permit the use of at least a portion of sodium carbonate in the saponification; thus, for example, it has been suggested that rosin can be saponified by a preliminarily partial neutralization with sodium carbonate and a subsequent complete neutralization with caustic soda. Such two-stage operations, however, require extra equipment and extra handling of the material, thereby offsetting the advantages of the use of soda ash. In addition, it has frequently been found that the dry product obtained after a carbonate saponification tends to be relatively less stable upon storage. It has previously been considered impossible to overcome these difficulties by releasing, during saponification, a portion of the carbon dioxide gas, partly because it has not been thought that the reaction would proceed substantially to completion even if the operating difficulties were overcome, but, also because saponified rosin is an efficient frothing and foaming agent so that excessive loss of material through frothing has accompanied attempts to relieve the pressure by venting.

Now according to the present invention, it has been found that a valuable dry, saponified rosin material or resinate may be formed by neutralizing rosin solely with soda ash under carefully controlled conditions of temperature and pressure, whereby operating difficulties are eliminated, and there is produced a substantially completely neutralized product which is readily dried, for example, by spray drying. The pressure control is attained by removing a portion of the resulting carbon dioxide gas at a predetermined pressure and it has been found, surprisingly, that within a limited pressure and temperature range, the removal of the gas may be accomplished with a minimum of frothing or foaming, the minimum being sufficiently low so as to be compatible with ordinary operating procedure.

In carrying out the present invention, molten rosin is reacted with an amount of aqueous sodium carbonate only slightly greater than the theoretical amount for complete neutralization at a pressure between about 160 lb./sq. in. and about 250 lb./sq. in., at a temperature between about 150° and 250° C. and in the presence of a small quantity of a silicate. The amount of solid and liquid in the reaction vessel may comprise up to about 85% of the total volume of the vessel, and the desired pressure is maintained by releasing a portion of the formed carbon dioxide, for example, by manual or automatically controlled venting. After substantially complete neutralization, the product is released through a spray nozzle into a drying chamber through which is passed drying air, preferably in a direction substantially countercurrent to the sprayed product, and the dried product is collected. The product is a substantially completely neutralized dry rosin material containing not more than about 5% of unneutralized or free rosin and containing not more than about 1% of unreacted saponifying agent.

The nature of the invention having been indicated in a general manner, the following specific examples are presented in illustration, but not in limitation, of preferred methods of operation according to this invention.

Example I

An autoclave was used which has a maximum allowable pressure of approximately 250 lb./sq. in. gage pressure and is standard equipment for the neutralization and saponification of rosin by means of sodium hydroxide. A vent line was provided in the autoclave, with a manually operated control valve to permit the desired venting and pressure control.

In this autoclave were mixed 300 parts of an FF grade wood rosin and a solution of 52.2 parts of soda ash contained in 134 parts of water, 18 parts of a paraffin oil, 1.2 parts of phenyl β-naphthylamine and 0.65 part of sodium silicate. The mixture was heated to 172° C. at which time the gage pressure had reached 220 lb./sq. in. Gas was then released through the vent line until the pressure was reduced to 165 lb./sq. in., and the product was cooked for a period of one-half hour during which time the temperature rose to 193° C. and no substantial pressure increase was noted. The thus reacted material was released through a spray nozzle into a drying chamber while drying air was passed countercurrently through the drying chamber at a temperature of 135° F. The product was a light-colored, fine powder containing 4.4% free rosin, 0.5% free carbonate, 0.21% free bicarbonate and 3.38% moisture and was characterized by being stable over long periods of storage and by being readily dispersible in water.

*Example II*

A dry saponified product was prepared in the pressure equipment described in Example I, using a mixture of an FF grade wood rosin and a partially gasoline-insoluble dark-colored rosin by-product obtained in the solvent purification of rosin. This partially gasoline-insoluble product was characterized by having an acid number of 119, melting point of 186°, a saponification number of about 153 and containing about 60% gasoline-insoluble material and about 12% unsaponifiable material. It was composed of about 30 to 40% resin acids, about 40 to 50% oxidized resin acids and about 10 to 12% nonacid constituents.

Five hundred forty parts of the FF grade wood rosin and 60 parts of the by-product rosin material were melted in the pressure vessel and 315 parts by weight of a 30% soda ash solution was injected therein. Thirty-six parts of a paraffin oil and 1.25 parts of sodium silicate were then added and the vessel was closed. The mixture was heated while maintaining continuous venting of the gas so that the pressure increased slowly during the reaction, reaching a maximum of 185 lb./sq. in. at a temperature of 190° C. The total reacting time was about one-half hour. The saponified product was released through a spray nozzle and dried as described in Example I to yield a product relatively light in color but somewhat darker than the product obtained in Example I and characterized by high stability upon storage. The product contained 1.6% free rosin or rosin by-product, 0.25% free carbonate, 0.42% free bicarbonate and 0.49% moisture. It was completely soluble or dispersible in water, having a solubility time of about 60 seconds.

*Example III*

An autoclave was charged with 731 parts of gum rosin and 2192 parts of an FF wood rosin and 187 parts of a paraffin oil was added as a plasticizer. One thousand four-hundred eighty parts by weight of 30.8% soda ash solution was added together with 7.8 parts by weight of sodium silicate (29% $SiO_2$). The autoclave was closed and the temperature of the mixture was raised over a two-hour period to 199° C. and the pressure was maintained at 200 pounds gage pressure during the heating period by automatic venting of the gases. At the end of this two-hour period, the mixture was released through a spray nozzle as described in Example I and the spray-dried product collected. The product was a light tan colored powder having a free rosin content of 3.2%, total solids 97.8% and free alkali (calculated as bicarbonate) of 0.25%.

In selecting the rosin for the composition according to this invention, there may be used the various grades of wood or gum rosin as desired such as, for example, an FF wood rosin or one of the paler or darker grades of rosin and modified rosins. Thus, there may be used rosin itself, hydrogenated rosin, polymerized rosin, partially decarboxylated rosin, heat-treated rosin, or the like, either alone or two or more of these materials in combination, and likewise, there may be used various darker grades of rosin and rosinlike materials such as, for example, a partially gasoline-insoluble dark-colored natural resin separated as a by-product during the purification of a wood or gum rosin. Highly satisfactory results have been obtained by using as the rosin a mixture of two or more rosin and rosinlike materials such as, for example, a mixture of an ordinary wood or gum rosin together with a partially gasoline-insoluble dark-colored rosin by-product material. The use of darker grades of rosin and natural resins either alone or in combination with lighter colored rosins is favored where their darker color is not detrimental, inasmuch as these materials are generally cheaper and more readily available. In addition, the use of these darker materials is favored for certain special uses where, for example, a paper sized with a composition prepared therefrom may have improved qualities in certain special sizing characteristics.

Thus, the term "rosin" as used in the specification and claims will be understood to include materials such as wood or gum rosin and also rosinlike materials and modified rosins which are similar in properties to rosin and are characterized by being saponifiable to form materials substantially like ordinary resinates; and the term "resinate," therefore, includes the substantially neutral, saponified material obtained therefrom.

Various rosin modifiers such as plasticizers and other rosin compatible nonrosin materials and compositions may be added to the composition itself or to the rosin prior to its compounding to an extent conforming with its compatibility with the rosin, in order to improve or modify the physical or chemical properties of the rosin component or the dry resinate composition. For example, small amounts of plasticizers and the like as well as other additives such as oxidation inhibitors or the like may be included in the composition to improve the properties thereof.

The process of saponifying and drying the rosin material comprises mixing the rosin and the soda ash in the desired proportions and heating and venting the mixture according to the conditions and limits set forth herein at a temperature between 150 and 250° C. When the reaction is completed, the mixture is discharged under its own pressure through a spray nozzle into a drying chamber maintained substantially at atmospheric pressure and at such conditions of temperature and humidity to dry the product quickly to a fine dry powder. The drying conditions may vary, but, when as is usually the case, the mixture to be dried contains about 15 to about 35% water, the drying air will be maintained at a temperature between about 65 and about 150° C. and at a relative humidity less than about 80%. The drying conditions may conveniently be maintained by continuously circulating hot air through the chamber, preferably in a direction countercurrent to the discharge of the mixture through the spraying nozzle.

Antioxidants and other modifying agents such as, for example, small quantities of waxes, oils, amine derivatives and the like may conveniently be added to the composition at various stages thereof, preferably prior to the drying of the saponified product. Thus, small quantities of paraffin oil or wax or other antioxidant ingredients such as, for example, phenyl β-naphthylamine as disclosed in Example I may advantageously be added to the mixture prior to the saponification reaction or, if desired, at some other stage prior to the drying operation.

It has also been found that the stability of the dried product is markedly increased by the incorporation therein of small quantities of a silicate such as, for example, sodium silicate. This material, like those previously mentioned, is best added prior to the drying operation and may most conveniently be added during the initial mixing of the ingredients at the start of the saponification reaction. The amount of the silicate added is preferably a small fraction of 1% of the amount of soda ash, for example, between about 0.01 and 0.1. The addition of 0.02 to 0.03% of silicate provides a product whose resistance to oxidation is highly satisfactory.

In order to obtain an optimum product and satisfactory operation, it has been found necessary to control the pressure during the saponification reaction between a gage pressure of 160 lb./sq. in. as the lower limit and a gage pressure below about 250 lb./sq. in. as the upper limit, preferably in a range between about 180 and 230 lb./sq. in. When the pressure in the reaction mixture is vented to below about 160 lb./sq. in., there results excessive foaming which causes undue loss of material through the vent line and, accordingly, venting to a pressure below about 160 must be avoided during all stages of the saponification reaction until the reaction is complete and the material is ready for the drying operation; in large scale operations a minimum venting pressure of about 180 lb./sq. in. is preferred, and in small scale operations a minimum pressure of about 180 lb./sq. in. is somewhat more satisfactory.

On the other hand, the upper limit of the pressure is controlled by two limitations, namely, the safety range of the apparatus to be used and a maximum final pressure limit. Thus, in order to realize full economic return from the process according to this invention, there is used relatively inexpensive equipment generally having a maximum safe operating pressure of around 250 to 275 lb./sq. in. Obviously, care must be taken to maintain the pressure within the safety range of the equipment used.

In addition to the safety feature, it has also been found necessary to have a final reaction pressure of not more than about 250 and preferably not over about 230 lb./sq. in., inasmuch as a product whose final saponification pressure rises substantially above this value contains an excessive amount of free rosin because of the presence of carbon dioxide gas in the reaction vessel, and is characterized by relative instability. Therefore, while it is permissible for the pressure to rise above the preferred limit of about 250 lb./sq. in. gage pressure during the early period of the saponification reaction, the pressure during the latter and major part of the saponification reaction is maintained below about 250 and preferably not over about 230 lb./sq. in. in order to realize substantially complete saponification. When the final pressure rises above 230 lb./sq. in., the free rosin content of the product may rise above 5%, yielding a product which is commercially usable, but not in the optimum range. The upper limit thus determined is a maximum of about 250 lb./sq. in., preferably about 230 lb./sq. in. Accordingly, an optimum range of saponification pressure whereby there is obtained substantial freedom from frothing and at the same time substantially complete saponification is between about 180 lb./sq. in. gage pressure and about 230 lb./sq. in. gage pressure for the latter and greater portion of the saponification period.

Where it is desired to operate at pressures near the lower pressure limit, namely, at 160 lb./sq. in. gage pressure, the danger of loss of material by foaming may be somewhat reduced by jacketing the vent line so as to cause rapid cooling of the escaping material. Such procedure, however, is not usually necessary under normal conditions of operation.

The excess of soda ash over that theoretically required for complete saponification of the product is generally between about 5 and 15%, preferably about 7%. The product prepared with this excess amount of soda ash is substantially completely saponified, generally between about 97 and 99% saponified and never less than 95%, and will be substantially free from excess carbonate and bicarbonate, i. e., containing less than 1% excess saponifying agent.

The dry saponified rosin material obtained according to this invention has the same general uses as dry resinates obtained by caustic soda saponification, such as, for example, in paper sizing, detergents, and the like. In addition, because of its less expensive preparation by the virtue of decreased cost of reagents and decreased corrosion during saponification, the composition prepared according to this invention may be adapted for use in fields where an ordinary rosin size or dry resinate is excluded because of economic reasons.

I claim:

1. The process for preparing a stable dry, substantially completely saponified rosin comprising reacting rosin with aqueous sodium carbonate at a temperature between 150 and 250° C. and under a pressure between 160 and 250 lb./sq. in. and maintaining said pressure throughout the reaction by partial release of carbon dioxide which is formed during the reaction, and subsequently releasing the reacted mixture under its own pressure through a spray nozzle into a chamber through which is passed warm dry air.

2. The process for preparing a stable dry, substantially completely saponified rosin comprising reacting rosin with aqueous sodium carbonate at a temperature between 150 and 250° C. and under a pressure between 180 and 230 lb./sq. in. and maintaining said pressure throughout the reaction by partial release of carbon dioxide which is formed during the reaction, and subsequently releasing the reacted mixture under its own pressure through a spray nozzle into a chamber through which is passed warm dry air.

3. The process for preparing a stable dry, substantially completely saponified rosin comprising reacting rosin with aqueous sodium carbonate in the presence of 0.01 to 0.1% of a silicate based on the dry weight of sodium carbonate at a temperature between 150 and 250° C. and under a pressure between 180 and 230 lb./sq. in. and maintaining said pressure throughout the reaction by partial release of carbon dioxide which is formed during the reaction, and subsequently releasing the reacted mixture under its own pressure through a spray nozzle into a chamber through which is passed heated dry air.

4. The process for preparing a stable dry, saponified rosin comprising reacting rosin with aqueous sodium carbonate in the presence of 0.01 to 0.1% of a silicate based on the dry weight of sodium carbonate at a temperature of about 200° C. and under a pressure of about 200 lb./sq. in. and maintaining said pressure throughout the reaction by partial release of carbon dioxide which is formed during the reaction, and subsequently releasing the reacted mixture under its own pressure through a spray nozzle into a chamber through which is passed heated dry air, the amount of sodium carbonate being about 105% of the amount theoretically required for complete saponification.

JOHN J. FLAHERTY, Jr.

REFERENCES CITED

The following references are of record in the file of this patent:

UNITED STATES PATENTS

| Number | Name | Date |
|---|---|---|
| 2,052,170 | Engelmann | Aug. 25, 1936 |
| 2,134,911 | Dreshfield | Nov. 1, 1938 |
| 2,178,532 | Thurman | Oct. 31, 1939 |
| 2,193,786 | Thurman | Mar. 12, 1940 |